United States Patent [19]

Koyanagi et al.

[11] 3,812,215

[45] May 21, 1974

[54] METHOD FOR MANUFACTURING VINYL CHLORIDE GRAFT POLYMERS

[75] Inventors: Shuniche Koyanagi; Hajima Kitamura; Akiyoshi Maruyama, all of Niigata-ken, Japan

[73] Assignee: Shinetsu Chemical Company, Tokyo, Japan

[22] Filed: Mar. 20, 1973

[21] Appl. No.: 342,937

Related U.S. Application Data

[63] Continuation of Ser. No. 163,430, July 16, 1971, abandoned, which is a continuation of Ser. No. 843,747, Sept. 8, 1969, abandoned.

[30] Foreign Application Priority Data

July 31, 1968 Japan.............................. 43-53640

[52] U.S. Cl............................................. 260/878 R
[51] Int. Cl. ............................................ C08f 15/40
[58] Field of Search .............................. 260/878 R

[56] References Cited
UNITED STATES PATENTS 3,018,266 1/1962 Lundberg.......................... 260/45.4
3,125,546 3/1964 Pinner et al. .................... 260/45.5
3,305,606 2/1967 Hardt et al.......................... 260/878
3,322,858 5/1967 Coaiter et al...................... 260/876
3,355,516 11/1967 Hardt et al.......................... 260/878
3,358,054 12/1967 Hardt et al.......................... 260/878

FOREIGN PATENTS OR APPLICATIONS 1,028,883 5/1966 Great Britain...................... 260/878
1,035,601 7/1966 Great Britain...................... 260/878

Primary Examiner—Stanford M. Levin
Attorney, Agent, or Firm—Toren & McGeady

[57] ABSTRACT

A vinyl chloride graft polymer is obtained by polymerization of a vinyl chloride monomer with a multifunctional monomeric ester in the presence of an ethylenevinyl ester copolymer. Thus obtained graft polymer is improved in such properties as impact strength, weathering resistance and workability, and besides, minimizes the lowering of softening temperature and improved its gellation property and fluidity in molding.

5 Claims, No Drawings

METHOD FOR MANUFACTURING VINYL CHLORIDE GRAFT POLYMERS

This is a continuation of application Ser. No. 163,430 filed July 16, 1971 which, in turn, was a continuation of application Ser. No. 843,747 filed Sept. 8, 1969 both now abandoned.

SUMMARY OF THE INVENTION

This invention relates to a method for manufacturing vinyl chloride graft polymers having such properties as excellent impact strength and weathering resistance, and also having minimized lowering of softening temperature.

It is already known that vinyl chloride resins are blended with some other suitable resins, such as so-called ABS resins consisting of butadiene, styrene and acrylonitrile or acrylic ester, and post-chlorinated polyolefin, in order to improve the impact strength of molded products of the vinyl chloride resins. It may be true that the use of these resins serves to improve the impact strength, but the blended products of vinyl chloride resins and ABS resins show a much more remarkable deterioration of impact strength than the products of vinyl chloride resins alone, when used outdoors, because the ABS resins themselves have inferior weather resistance; while the blended products of vinyl chloride resins and post-chlorinated polyolefins have such disadvantages as considerably lowering their softening temperature and greatly reducing their transparency, compared with the products of vinyl chloride resins alone.

Further, in order to attain the above-mentioned object, a polymerization method of a vinyl chloride monomer with an ethylene-vinyl acetate copolymer containing from 20 to 80 percent by weight of vinyl acetate in the presence of a free radical catalyzer has been proposed (cf: U.S. Pat. No. 3,358,054). Though the polymers obtained by this method have excellent Izod impact strength and extensibility, they have such defects that show a great lowering of softening temperature and also unsatisfactory gellation and fluidity in molding processes.

One object of this invention is to provide a method for manufacturing a new and useful vinyl chloride graft polymer having excellent impact strength and weathering resistance, free from all of the above-mentioned drawbacks, and another object is to provide a method for manufacturing vinyl chloride graft polymer having excellent gellation property and fluidity in processing stages.

This invention is characterized by polymerizing a vinyl chloride monomer and a multi-functional monomeric ester in the presence of an ethylene-vinyl ester copolymer. In the known graft polymerization of the ethylene-vinyl ester copolymer and the vinyl chloride monomer, when a multi-functional monomeric ester such as ethylene glycol dimethacrylate is added in the reaction medium, there occur such complicated reactions as the graft polymerization of the multi-functional monomeric ester and the ethylene-vinyl ester copolymer, and the copolymerization of the multi-functional monomeric ester and the vinyl chloride monomer, as well as the graft polymerization of the ethylene-vinyl ester copolymer and the vinyl chloride monomer, and as a result, it is suggested that the structure of the polymer obtained is cross-linked, thereby giving the minimized lowering of softening temperature, excellent gellation property and fluidity in molding process, in comparison with the conventional vinyl chloride graft polymerization.

The ethylene-vinyl ester copolymer used in this invention is given by the conventional solution polymerization. The vinyl ester ingredient in the copolymer is desirably from 20 to 80 percent, or more preferably between 30 and 70 percent by weight of vinyl ester. This is because if the amount of the vinyl ester is less than 20 percent, its dispersion into the vinyl chloride monomer would be insufficient, and the transparency and the softening temperature of the vinyl chloride graft polymer obtained be deteriorated. On the other hand, if it is more than 80 percent, undesirable effects would be given to the polymer obtained in respect to impact strength, mechanical property and brittleness at low temperatures. As its intrinsic viscosity becomes higher, said copolymer will have difficult dispersion into the vinyl chloride monomer, and as its viscosity becomes lower, The polymer obtained will have such disadvantages as reduction of impact strength and of brittleness at low temperatures. Therefore the viscosity of the copolymer is preferable to be in the range of from 0.2 to 1.5.

Further, the vinyl ester monomer constituting the copolymer is preferable to have alkyl radical containing carbon atoms of not more than 8 in number, and it is also preferable at least one kind selected from the group consisting of vinyl acetate, vinyl propionate, vinyl butylate and vinyl benzoate. If the number of carbon atoms is more than 8, the vinyl ester monomer would become costly and less economical, and also the copolymer of said vinyl ester and ethylene reduces its molecular weight and softening temperature, which is not suitable for improvement of vinyl chloride resins. Similarly, if the quantity of the above-mentioned ethylene-vinyl ester copolymer to be used in polymerization is too small, the impact strength of the obtained polymer would not be improved and if such quantity is too great, the softening temperature would be reduced to such extent that is unsuitable for rigid molded products. Consequently, the quantity of the copolymer in the graft polymer is desirable to be in the range of from 2 to 20 percent by weight of the copolymer.

Said multi-functional monomeric esters include esters of polyalcohols and unsaturated carboxylic acids, and esters of unsaturated alcohols and unsaturated carboxylic acids, namely: ethylene glycol dimethacrylate, diethylene glycol dimethacrylate, triethylene glycol dimethacrylate, polyethylene glycol dimethacrylate, 1.4 butylene glycol dimethacrylate, 1.3 butylene glycol dimethacrylate, propylene glycol dimethacrylate, diethylene glycol diacrylate, triethylene glycol diacrylate, 1.4 butylene glycol diacrylate, allyl methacrylate, diallyl fumarate, trimethylol propane trimethacrylate and trimethylol propane triacrylate, etc. These multi-functional monomeric esters may be used either singly or as a mixture of more than two, in an amount range of from 0.05 to 2 percent by weight. If the quantity of such an ester or a mixture of esters is too small, the cross-linking effect which is the object of this invention, namely, an effect to prevent the softening temperature from lowering would not be given. On the other hand, if such quantity is too great, polymerization reaction time would become much longer and fluidity of the polymer obtained be reduced.

In the practice of polymerization method by this invention, suspension polymerization or emulsion polymerization, in aqueous medium in the presence of free radical catalyzer, or solution polymerization or bulk polymerization, same as the conventional process for manufacturing vinyl chloride homopolymer or its copolymer, is applied, especially, suspension polymerization or emulsion polymerization being preferable.

In case of suspension polymerization, the polymerization is carried out in aqueous medium which is dissolved or dispsered with at least one kind of water soluble polymer such as polyvinyl alcohol, cellulose ether, vinyl acetatemaleic acid anhydride copolymer and gelatine, or of water insoluble solid powder such as calcium carbonate, barium sulfate, calcium phosphate, talc and bentonite, as suspension stabilizer, in the presence of at least one kind of oil soluble peroxide such as lauroyl peroxide, benzoyl peroxide, acetyl peroxide, 2.4-dichloro benzoyl peroxide, acetyl cyclohexyl persulfonyl and di-isopropyl peroxy carbonate, or of azo compound such as azobis-isobutylonitrile and $\alpha,\alpha'$-azobis 2.4 dimethyl valeronitrile, and further if desired, in the presence of accelerator such as organic amine.

On the other hand, in case of emulsion polymerization, using at least one kind of anionic surfactant such as alkyl sulfate, alkyl sulfonate and alkyl aryl sulfonate, or of nonionic surfactant such as alkyl ether or ester of polyoxyethylene, sorbitan alkyl ester and polyoxy ethylene propylene glycol ether as emulsifier, polymerization is carried out in aqueous medium with stirring in the presence of at least one kind of water soluble radical initiator such as persulfate and hydrogen peroxide.

When the molecular weight of vinyl chloride ingredient of the vinyl chloride graft polymer obtained by the method of this invention is loo low, heat resisting and other physical properties of the molded products become worse, so that the polymerization temperature is preferably kept at 30° – 70° C to avoid such worsening. In carrying out this invention, to the reaction system there may be added pH controlling agent to control the rate of polymerization reaction or the particle diameter of the polymer to be obtained and organic solvents which have no radical polymerizability essentially such as alcohols, aliphatic or aromatic hydrocarbons, halogenated hydrocarbons ketones and esters to control the highness or distribution of molecular weight of the polymer, and further, other polymerizable monomer, unless the object of this invention is not impaired.

The method of the invention will now be described by Examples and Controls in which the amount of the components or ingredients are given in parts by weight or in percent by weight. The physical properties of the graft polymer were measured by the method given as follows;

(Preparation of test pieces)

To 100 parts of the sample were added 1 part of tribasic lead sulfate, 1.5 parts of lead stearate and 0.5 parts of dibasic lead sulfate, and the mixture was kneaded on a roller mill for 10 minutes at the temperature of 170° C. A part of the sheet obtained by kneading was subjected to the flow-temperature test, and some of the remaining part was pressed for 10 minutes at 180° C into a 0.2 inch-thick sheet, and the rest into a 1 mm-thick sheet, the former to be put to the impact strength test and the latter to the softening test.

1. Softening temperature:

By the method of ASTM-D 1045-51, the change of rigidity of the resin with the change of temperatures was measured, and the point at which the rigidity of torsion became $3.17 \times 10^3$ kg/cm$^2$ was employed to show the softening temperature.

2. Impact strength:

By the method of ASTM-D-256, a 0.2 inch-thick sheet of the resin was tested at 20° C on an Izod tester to know the impact strength thereof.

3. Flow temperature:

The resin was worked on a roller mill and the sheet obtained was put on a Koka-type flow tester equipped with a nozzle of 1 mm in diameter and 10 mm in length. Under the load of 200 kg, the temperature of the tester was raised at the rate of 6° C/min. and the point at which the flow rate became 2 mm$^3$/sec. was employed to show the flow temperature of the resin.

4. Brittle temperature:

By the method of ASTM-D-746-55T, a 1 mm-thick sheet of resin was tested to know its brittle temperature.

Example 1

20 parts of ethylene-vinyl acetate copolymer having an intrinsic viscosity of 0.95 (measured in xylene solution) and containing 45 percent by weight of vinyl acetate ingredient, 800 parts of water, 1.0 part of polyvinyl alcohol having saponification degree of 80% by mol weight and polymerization degree of 1830, 0.12 part of $\alpha,\alpha'$-azobis 2,4-dimethyl valero nitrile and ethylene glycol dimethyl acrylate in the ratio shown in Table 1 were charged in an autoclave with stirrer. Subsequently, pressure in the autoclave is reduced to 40 mmHg, then 400 parts of vinyl chloride monomer were charged. The mixture was preliminarily stirred at room temperature for 5 hours, and set on polymerization at 56° C. When pressure in the autoclave was reduced to 5 kg/cm$^2$G, polymerization reaction was finished. Properties of the graft polymer thus obtained were shown in Table 1.

TABLE 1

| | Experiment No. | | | | | |
|---|---|---|---|---|---|---|
| | 1 | 2 | 3 | 4 | 5 | 6 (Reference) |
| Polymerization condition: | | | | | | |
| Added quantity of ethylene glycol dimethacrylate (parts) | 0.4 | 1.4 | 2 | 3 | 4 | 0 |
| Polymerization time (hrs) | 11 | 14.5 | 17 | 19 | 20 | 10 |
| Test result: | | | | | | |
| Softening temperature (°C) | 69.0 | 71.0 | 72.0 | 73.5 | 75.5 | 65.0 |
| Brittle temperature (°C) | −26.5 | −26.5 | −29.5 | −30.5 | −30.5 | −31.5 |
| Impact strength (ft. lb/in$^2$) | 7.31 | 11.91 | 8.39 | 8.28 | 9.89 | 7.28 |
| Flow temperature (°C) | 159.7 | 160.0 | 162.3 | 164.5 | 168.2 | 158.0 |
| Yields of graft polymer (parts) | 384 | 386 | 385 | 390 | 388 | 386 |

From the above result, the softening temperature of the graft polymer (Experiments No. 1-5) obtained by the method of this invention was recognized to be considerably higher compared with that of Reference (Experiment No. 6).

Example 2

Vinyl chloride monomer was polymerized in the same way as Example 1 except that 30 parts of ethylene-vinyl acetate copolymer, and 1.0 part of polyvinyl alcohol and 0.5 parts of methyl cellulose as suspending agents were used. Each experiment resulted in obtaining 385-390 parts of graft polymer having properties shown in Table 2.

Example 3

Vinyl chloride monomer was polymerized same as Example 1 except that 40 parts of ethylene-vinyl acetate copolymer, and 1.2 parts of polyvinyl alcohol and 0.6 part of methyl cellulose as suspending agents were used, obtaining the graft polymers as shown in Table 3, each having brittle temperature of less than –60° C.

Example 4

Vinyl chloride monomer was polymerized same as Example 1 except that 20 parts of ethylene-vinyl acetate copolymer having an intrinsic viscosity of 0.95 and containing 45 percent of vinyl acetate ingredient, 0.8 part of polyvinyl alcohol and 0.4 part of methyl cellulose as suspending agents, and propylene glycol dimethacrylate in various quantities shown in Table 4 were used, obtaining the graft polymers shown in Table 4.

TABLE 2

| | Experiment No. | | | | | |
|---|---|---|---|---|---|---|
| | 7 | 8 | 9 | 10 | 11 | 12 (Reference) |
| Polymerization condition: | | | | | | |
| Added quantity of ethylene glycol dimethacrylate (parts) | 0.4 | 1.2 | 2 | 3 | 4 | 0 |
| Polymerization time (hrs) | 10.5 | 11.0 | 11.5 | 14.0 | 17.0 | 10.0 |
| Experiment result: | | | | | | |
| Softening temperature (°C) | 52.4 | 54.0 | 57.1 | 60.0 | 61.1 | 50.0 |
| Brittle temperature (°C) | –45.5 | –45.0 | (¹) | (¹) | (¹) | –40.5 |
| Flow temperature (°C) | 142.0 | 143.0 | 145.5 | 146.0 | 148.0 | 140.0 |

¹ Less than –60.

TABLE 3

| | Experiment No. | | | | | |
|---|---|---|---|---|---|---|
| | 13 | 14 | 15 | 16 | 17 | 18 (Reference) |
| Polymerization condition: | | | | | | |
| Added quantity of ethylene glycol dimethacrylate (parts) | 0.4 | 1.2 | 2 | 3 | 4 | 0 |
| Polymerization time (hrs) | 10.5 | 11.5 | 12.5 | 15.0 | 18.0 | 9.5 |
| Test result: | | | | | | |
| Softening temperature (°C) | 42.7 | 44.6 | 47.6 | 49.5 | 53.0 | 40.0 |
| Flow temperature (°C) | 134.0 | 138.0 | 140.5 | 141.5 | 143.0 | 132.0 |

TABLE 4

| | Experiment No. | | | | |
|---|---|---|---|---|---|
| | 19 | 20 | 21 | 22 | 23 |
| Polymerization condition: | | | | | |
| Added quantity of propylene glycol dimethacrylate (parts) | 0.4 | 1.2 | 2 | 3 | 4 |
| Polymerization time (hrs) | 12 | 15 | 18 | 20 | 22 |
| Test result: | | | | | |
| Softening temperature (°C) | 70.0 | 71.5 | 72.0 | 74.0 | 76.0 |
| Brittle temperature (°C) | –32.1 | –34.0 | –35.5 | –35.0 | –36.0 |
| Impact strength (ft. lb/in²) | 7.18 | 7.40 | 8.11 | 7.22 | 7.04 |
| Flow temperature (°C) | 162.0 | 164.0 | 167.5 | 169.0 | 172.0 |
| Yields of graft polymer (parts) | 387 | 385 | 386 | 390 | 388 |

Example 5

Vinyl chloride was polymerized, same as Example 4 except that diallyl fumarate in various quantities shown in Table 5 instead of propylene glycol dimethacrylate in Example 4 was used, obtaining the graft polymers shown in Table 5.

TABLE 5

| | Experiment No. | | | | |
|---|---|---|---|---|---|
| | 24 | 25 | 26 | 27 | 28 |
| Polymerization condition: | | | | | |
| Added quantity of diallyl fumarate (parts) | 0.4 | 1.2 | 2 | 3 | 4 |
| Polymerization time (hrs) | 15 | 18 | 22 | 26 | 32 |
| Test result: | | | | | |
| Softening temperature (°C) | 71.0 | 72.0 | 74.5 | 75.0 | 77.0 |
| Brittle temperature (°C) | −28.6 | −29.2 | −27.5 | −29.0 | −31.0 |
| Impact strength (ft. lb/in$^2$) | 9.38 | 10.21 | 10.34 | 9.98 | 10.12 |
| Flow temperature (°C) | 170 | 172 | 173.5 | 176 | 182 |
| Yields of graft polymer (parts) | 370 | 369 | 373 | 370 | 371 |

Example 6

Vinyl chloride was polymerized, same as Example 1 except that 20 parts of various ethylene-vinyl ester copolymers shown in Table 6 and 1.2 parts of multifunctional monomeric ester were used, obtaining the graft polymers shown in Table 6.

TABLE 6

| | Experiment No. | | | | | | | |
|---|---|---|---|---|---|---|---|---|
| | 29 | 30 | 31 | 32 | 33 | 34 | 35 | 36 (Reference) |
| Ethylene vinyl ester copolymer: | | | | | | | | |
| Kinds of vinyl ester | Vinyl acetate | Vinyl acetate | Vinyl acetate | Vinyl acetate | Vinyl acetate | Vinyl acetate | Vinyl propionate | Vinyl propionate |
| Contents of vinyl ester | 45% | 45% | 45% | 45% | 35% | 60% | 40% | 40% |
| Intrinsic viscosity of copolymer | 0.95 | 0.95 | 0.95 | 0.95 | 1.03 | 0.86 | 0.76 | 0.76 |
| Multi-functional monomeric ester | Diethylene glycol dimethacrylate | Polyethylene glycol dimethacrylate | 1.4 butylene glycol dimethacrylate | Diethylene glycol dimethacrylate | Ethylene glycol dimethacrylate | Ethylene glycol dimethacrylate | Ethylene glycol dimethacrylate | None |
| Polymerization time (hrs) | 14.5 | 14.5 | 14.5 | 14.5 | 15.0 | 14.3 | 14.5 | 14.5 |
| Softening temperature (°C) | 69.7 | 68.8 | 70.8 | 71.2 | 69.0 | 70.5 | 68.5 | 62.1 |
| Brittle temperature (°C) | | | | | −28.5 | −25.5 | | |
| Impact strength (ft. lb/in$^2$) | 11.32 | 15.64 | 10.83 | 10.11 | 13.50 | 8.65 | 12.03 | 7.15 |
| Flow temperature (°C) | 170 | 168 | 170.5 | 171.5 | 156.5 | 161.3 | 158.9 | 156.8 |
| Yields of graft polymer (parts) | 385 | 386 | 380 | 383 | 390 | 387 | 382 | 386 |

Example 7

20 parts of ethylene-vinyl acetate copolymer having an intrinsic viscosity of 0.95 measured in xylene solution and containing 45 percent by weight of vinyl acetate ingredient, 800 parts of water, 9 parts of sodium lauryl sulfate, 4 parts of polyoxyethylene sorbitan laurate (HLB - 18), 0.4 part of potassium persulfate, 2 parts of ethylene glycol dimethacrylate and 400 parts of vinyl chloride monomer were charged into an autoclave with stirrer, and emulsion polymerization was carried out at 50° C for 23 hours. Then the reaction mixture thus obtained was salted out with aluminum sulfate, filtered, washed with water and dried. The properties of the graft polymer thus obtained were measured at 72.4° C in softening temperature, more than 20 ft. lb/in$^2$ in impact strength and 171.5° C in flow temperature.

On the other hand, the properties of the polymer obtained by the same way as the above except that ethylene glycol dimethacrylate was not added, were found to have a softening temperature of 66.3° C, an impact strength of 8.10 ft. lb/in$^2$ and a flow temperature of 164° C.

What is claimed is:

1. A graft copolymer consisting essentially of vinyl chloride and at least one multifunctional monomeric ester, in an amount equal to from 0.05 to 2 percent by weight of the vinyl chloride, selected from the group consisting of ethylene glycol dimethacrylate, propylene glycol dimethacrylate, diethylene glycol dimethacrylate, 1,4 butylene glycol dimethacrylate, and triethylene glycol dimethacrylate, which are grafted onto an ethylene-vinyl ester copolymer composed of 80 to 20 percent by weight of ethylene and 20 to 80 percent by weight of a vinyl ester selected from the group consisting of vinyl acetate and vinyl propionate, the ethylene-vinyl ester copolymer having an intrinsic viscosity of from 0.2 to 1.5 as measured in xylene and the amount of the ethylene-vinyl ester copolymer being from 2 to 20 percent by weight based on the weight of the graft copolymer.

2. The graft copolymer as claimed in claim 1 wherein said multifunctional monomeric ester is ethylene glycol dimethacrylate.

3. The graft copolymer as claimed in claim 1 wherein said multifunctional monomeric ester is propylene glycol dimethacrylate.

4. The graft copolymer as claimed in claim 1 wherein said multifunctional monomeric ester is diethylene glycol dimethacrylate.

5. The graft copolymer as claimed in claim 1 wherein said multifunctional monomeric ester is 1,4-butylene glycol dimethacrylate.

* * * * *